United States Patent
Khu (10) Patent No.: US 7,117,341 B2
(45) Date of Patent: Oct. 3, 2006

(54) STORING AND SELECTING MULTIPLE DATA STREAMS IN DISTRIBUTED MEMORY DEVICES

(75) Inventor: Arthur H. Khu, San Mateo, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 11/134,127

(22) Filed: May 20, 2005

(65) Prior Publication Data

US 2005/0213398 A1   Sep. 29, 2005

Related U.S. Application Data

(62) Division of application No. 10/337,766, filed on Jan. 6, 2003, now Pat. No. 6,912,646.

(51) Int. Cl.
*G06F 12/00* (2006.01)
*G06F 13/00* (2006.01)

(52) U.S. Cl. ............... 711/220; 711/119; 711/154; 711/163

(58) Field of Classification Search ............ 711/5, 711/100, 154, 163, 200, 219, 220
See application file for complete search history.

(56) References Cited

U.S. PATENT DOCUMENTS 5,742,786 A * 4/1998 Gallup et al. ............. 711/217
5,789,938 A   8/1998 Erickson et al.
5,923,614 A   7/1999 Erickson et al.
6,125,437 A * 9/2000 Buck-Gengler ............. 345/569

OTHER PUBLICATIONS

XILINX, Inc., "System ACE MPM Solution," Advanced Product Specification, Jun. 7, 2002, DS087 (v1.2), available from Xilinx, Inc., 2100 Logic Drive, San Jose, CA., 95124.
ATMEL CORPORATION, "In-System Programmable Configuration PROM," AT17F040/080, Advance Information, Nov. 2002, Rev 3039C-CNFG, available from Atmel Corporation, 2325 Orchard Parkway, San Jose, CA., 95131.

* cited by examiner

*Primary Examiner*—Tuan V. Thai
(74) *Attorney, Agent, or Firm*—Justin Liu (57) ABSTRACT

Prior art storage techniques have certain limitations, including requiring additional external resources to implement and not making use of all of the available storage space. A method and apparatus using a header table and, in some cases, an alternative access interface are described which allow for more efficient use of available memory space, permit an arbitrary number of data streams to be stored and accessed with a minimal interface, and provide for a simple serial connection to chain multiple memory devices together.

16 Claims, 6 Drawing Sheets

STORING AND SELECTING MULTIPLE DATA STREAMS IN DISTRIBUTED MEMORY DEVICES

FIELD OF THE INVENTION

The invention relates to memory devices. More particularly, the invention relates to storing multiple data streams in memory devices for configuring a programmable logic device.

BACKGROUND OF THE INVENTION

Nonvolatile memory such as a programmable read-only memory (PROM) is used to store data for extended periods of time. PROMs are faster than other forms of nonvolatile storage, such as magnetic or optical tapes or discs, and are much like volatile storage such as random access memory (RAM). PROMs have an advantage over RAM in that the stored data is not lost when power is disconnected. PROMs come in many different varieties, such as those that are eraseable and rewriteable.

A system including a volatile programmable logic device (PLD), such as an FPGA, typically includes a nonvolatile memory for storing configuration data for the PLD. When the system is powered up, a data stream with the configuration information in the nonvolatile memory is loaded into the volatile PLD to configure it so the system can become operational. PLDs have the advantage that they can be reconfigured while in the system, thus allowing the system to take on a different function without having to change any of the hardware in the system. It is also possible to change the hardware in the system to add new features, increase speed, or otherwise upgrade the system, and this typically requires reconfiguring the PLD to implement the new features or to work with other new hardware.

In certain cases, it is advantageous to have the ability to store multiple data streams in the nonvolatile memory so that the configuration of the PLD can be changed by selecting a different data stream without having to power down the system, and without having to reprogram or replace the PROM. For example, while a system is being developed, it may also be desirable to be able to change configurations and test multiple data streams. For another example, it may be desirable to allow for different data streams to be available so that a PLD can be customized for a particular application or so that one PLD may perform different operations at different times. As a further example, multiple data streams may also be needed in a system with multiple PLDs performing various functions, where each PLD has different programming data.

In some prior art implementations, an external controller is required to allow multiple data streams to be stored in one memory device. The external controller would locate the selected data stream in the memory device via select lines that map to memory addresses. This technique has the disadvantage that the number of data stream select pins limits the number of possible data streams that can be stored in the memory device. The maximum number of selectable data streams could be reached before the memory device was full, meaning that part of the storage space of the memory device would be wasted. This technique also requires significant external logic and external resources. One example of this prior art implementation is the Xilinx® System ACE™ MPM Solution, as described in Advanced Product Specification DS087 (v1.2) dated Jun. 7, 2002, available from Xilinx, Inc.

Another prior art technique for storing and retrieving multiple data streams includes using multiple memory devices. In one implementation, each memory device can store a different data stream, and an external muxing circuit is required to select the desired memory device and data stream. The size of the muxing circuit needed depends on the number of memory devices (and data streams) that are used. This technique also requires that a separate enable signal from the muxing circuit be routed to each memory device, increasing the demand on limited board-level or system-level routing resources.

Figure 1:
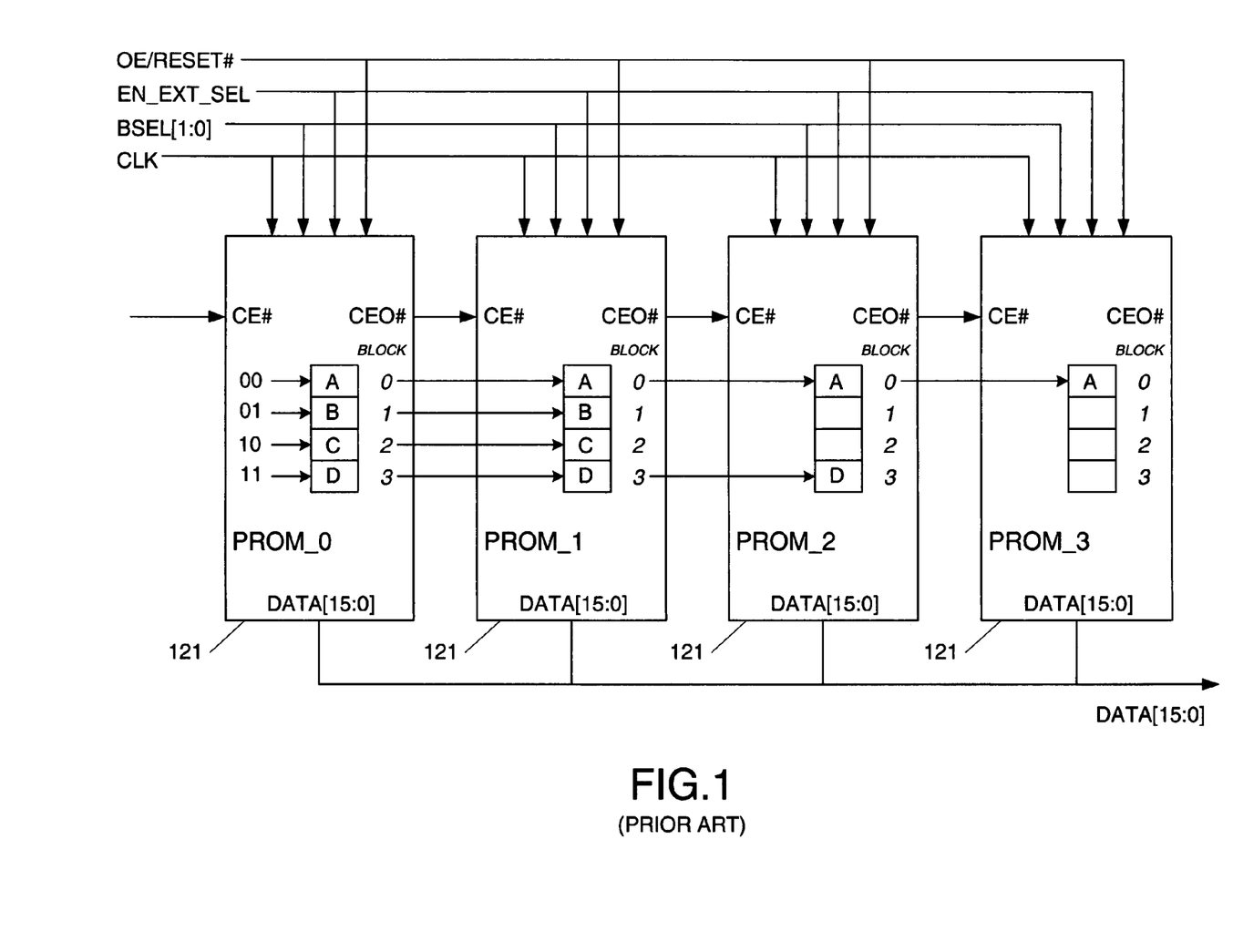
FIG. 1 shows a prior art implementation for storing multiple data streams in multiple memory devices.

In another prior art technique, shown in FIG. 1, multiple memory devices 121 are chained together, sharing certain input signals, including select lines. Each select line combination is associated with one logical block in each memory device (e.g., combination 00 is associated with logical block 0, combination 01 with logical block 1, etc.) When such a memory device is enabled, it will output the data contained in the logical block that is associated with the particular select line combination being asserted. One particular select line combination is assigned to each data stream stored in the multiple memory devices. In the example shown in FIG. 1, there are four data streams (labeled A–D) stored in the four memory devices shown. Select line combination 00 in this example has been assigned to data stream A, 01 to B, 10 to C, and 11 to D. Thus, data stream A is stored in logical block 0 in each memory device (since the select line combination assigned to data stream A corresponds to logical block 0), data stream B in logical block 1, etc. One disadvantage of this prior art technique is that a great deal of space in the memory devices is wasted. For example, two blocks in memory device PROM_2 and three blocks in PROM_3 are not used, and are wasted extra storage space since the four data streams A–D have varying lengths and therefore each occupy a different number of blocks. More specifically, in the example shown in FIG. 1, since data stream A is four blocks long, it requires a minimum of four memory devices; however, data stream B is only two blocks long, it requires only two memory devices, and logical block 1 (assigned to data stream B) in two of the four memory devices is not used and is wasted. A system may require different length data streams for programming multiple devices of different sizes. Examples of prior art devices making use of this technique are the Atmel® AT17F series of In-System Programmable Configuration PROMs available from Atmel Corporation.

Therefore, it would be desirable for a memory device, or a group of memory devices, to allow for better utilization of the available storage space, and to allow for storage of many data streams with a minimal amount of external logic and/or routing.

SUMMARY OF THE INVENTION

In accordance with the present invention, a memory device has start address, end address, and skip bit registers that are used for retrieval of data streams stored in the memory device. A data stream is selected by loading the registers with appropriate values for the selected data stream. The registers are loaded by the use of bank select lines and a header table, which holds a start bank, an end bank, and a skip bit for each data stream selectable by the bank select lines. Alternatively, the registers can be loaded with the desired values through the use of other interfaces. Once selected, if the skip bit indicates the memory device should not be skipped, the memory device outputs the data stream. The data output starts at the address in the start address register and continues sequentially until the address in the end address register is reached.

In accordance with the present invention, the memory device can be one of a chain of memory devices. The memory devices can share bank select lines and data output lines and can be linked serially through the chip enable signal.

BRIEF DESCRIPTION OF THE DRAWINGS

The present invention is illustrated by way of example, and not by way of limitation, in the following figures, in which like reference numerals refer to similar elements.

DETAILED DESCRIPTION OF THE DRAWINGS

The present invention is believed to be applicable to a variety of systems which make use of memory devices. While the present invention is not so limited, an appreciation of the present invention is presented by way of specific examples. In the following description, numerous specific details are set forth to provide a more thorough understanding of the present invention. However, it will be apparent to one skilled in the art that the present invention can be practiced without these specific details.

In accordance with the present invention, a memory device has various input and output control and data signals. This detailed description will describe the operation of some of these signals, although other equivalent signals may be used or substituted for those described herein. Also, other signals, not relevant for this discussion, may be used for other features, as is known to those of ordinary skill in the art.

In one embodiment, a memory device has one or more bank select lines as inputs. The bank select lines are used to select a bank, or a data stream, for output. For example, each of memory devices 212 and 272 shown in FIGS. 2A and 2B has two bank select lines (BSEL[1:0]). In general, however, a memory device can have an arbitrary number of bank select lines. The maximum number of data streams which can be selected by the bank select lines is $2^N$, where N is the number of bank select lines. In the examples shown in FIGS. 2A and 2B, since there are two bank select lines, up to $2^2=4$ banks (data streams) can be selected through the bank select lines.

In accordance with the invention, the memory device can be organized into logical blocks. In the examples shown in FIGS. 2A and 2B, each memory device is organized into four such blocks (numbered 0–3); however, in general, an arbitrary number of blocks can be allocated in each memory device. Data streams are stored in the memory device in consecutive blocks. For example, in memory device 212, data stream A, which is three blocks long, is stored in blocks 0, 1, and 2 of memory device 212; data stream B, which is one block long, is stored in block 3 of memory device 212. In memory device 272, there are four data streams (A, B, C, and D) which each take up one block (blocks 0, 1, 2, and 3, respectively) in memory device 272.

In one embodiment of the present invention, the memory device has a header table. The header table can be represented as a table, examples of which are shown as tables 216 and 276 in FIGS. 2A and 2B. The tables have one row of values for each bank of data selectable by the bank select lines, and each bank select line combination is associated with one row in the table. For example, if a memory device has two bank select lines, a total of four banks are selectable, and therefore the header table has four rows. Each row in the header table will contain values for a start block, an end block, and a skip bit for the corresponding bank select line combination. In one embodiment, the start and end blocks stored in the header table are the high order address bits of the complete memory address for the blocks. The actual implementation of the header table is not shown, as those having ordinary skill in the art will easily understand how the header table can be implemented. The header table can be stored in memory that is separate from the storage of data streams, or it can share memory space with the data streams.

The skip bit in the header table indicates whether the start and end blocks stored in that row of the header table should be "skipped," i.e., whether the data in that row are "don't care" values. In the examples shown, a skip bit value equal to a logic one means that the row should be skipped and that the start and end blocks stored in the row should not be used. A skip bit value equal to a logic zero means that the row should not be skipped, and that the start and end block data can be used.

In an embodiment, the start and end address block entries in the header table (for a row in which the skip bit is a logic zero) represent the high order address bits of the first block and last block, respectively, occupied by the data stream corresponding to that row. In an alternative embodiment, the end address block entry can be the high order address bits for the first block after the end of the last block of the selected data stream, or another value based on the specific addressing and storage scheme of a particular embodiment. The minimum number of address bits needed depends on the number of logical blocks into which the memory device is divided. For example, since memory device 212 is organized into four logical blocks (labeled 0–3), at least two high order bits of the start and end block addresses must be stored. In a row where the skip bit is a logical one (meaning that the start and end block data are not used) the header table has "don't care" values (represented by "XX" in the figures) for the start and end block entries of that row, and the start and end block entries can take on any arbitrary value.

Example memory device 212 (FIG. 2A) contains two data streams, labeled A and B. Data stream A is three blocks long and occupies logical blocks 0–2 of memory device 212. Data stream B takes up one block and occupies logical block 3. As stated above, one example where multiple data streams of different lengths can be used is a system with multiple PLDs to be programmed, each PLD having a different length program data stream. Bank select (BSEL[1:0]) combination 00 has been assigned to data stream A, and bank select 01 has been assigned to data stream B. Bank select combinations 10 and 11 are not used in memory device 212. A representation of the header table, based on this example, is shown in header table 216. In the row for BSEL[1:0]=00, the skip bit is set to a logic zero (indicating the data can be used), the start block is set to 0, and the end block is set to 2. This corresponds to data stream A, which occupies those blocks and can be selected by BSEL[1:0]=00 (this is represented in the top portion of FIG. 2A by the "00" and the arrow pointing to the start of data stream A). The second row of header table 216, corresponding to BSEL[1:0]=01, also has a skip bit value equal to a logic zero (the data can be used). The start and end blocks are both set to 3, representing data stream B, which occupies block 3 in memory device 212, and therefore both starts and ends in block 3. The two remaining rows of header table 216, corresponding to BSEL[1:0] equal to 10 and 11, have skip bits equal to a logic one, meaning the data in the header table for those bank select combinations should not be used. Therefore, "XX" (don't care) values appear as the entries for start and end blocks for those two rows in FIG. 2A.

Figures 2A, 2B:
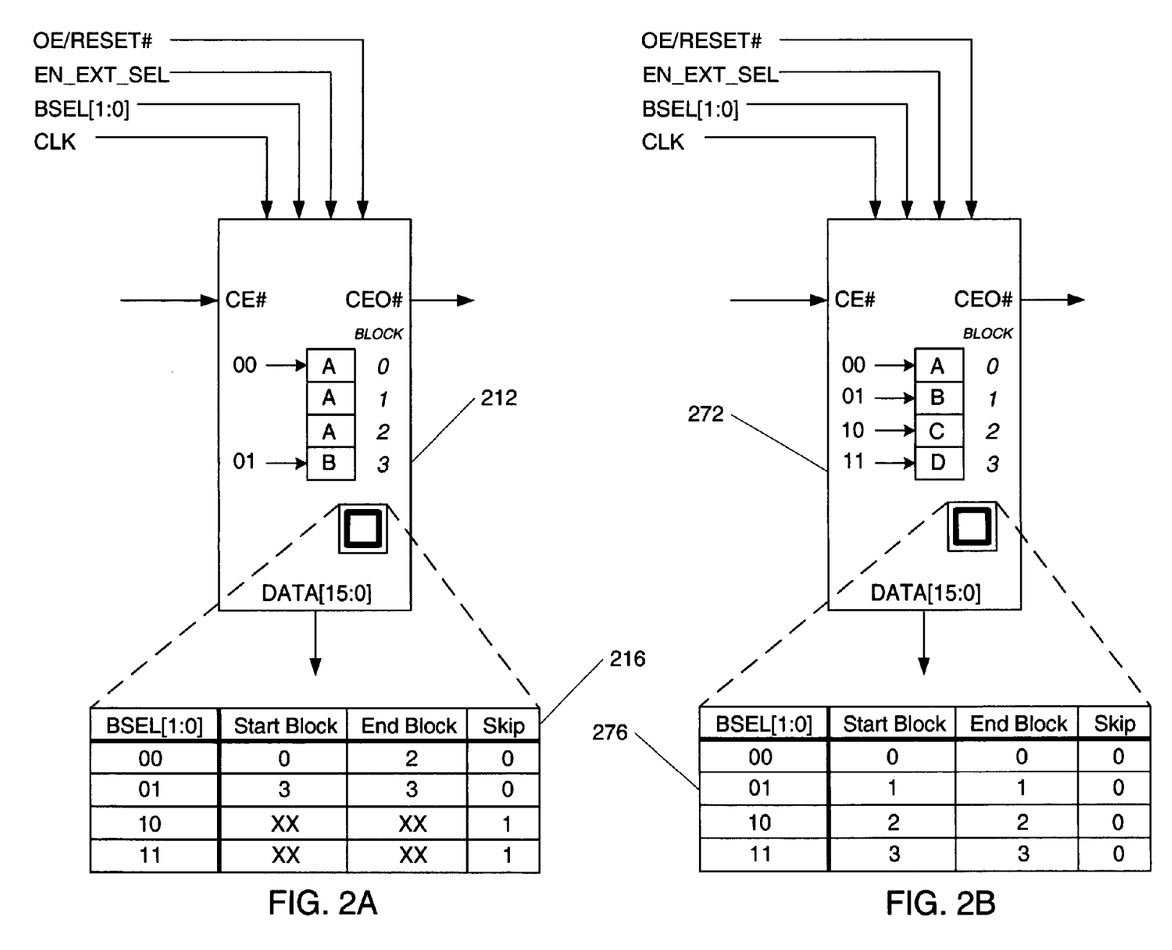
FIGS. 2A and 2B show examples memory devices in accordance with the present invention, each storing different sets of data.

In FIG. 2B, header table 276 represents the values that are stored for the data streams for memory device 271. There are four data streams (A, B, C, and D) in memory device 271, each occupying one block of memory. Bank select line combination 00 corresponds to data stream A, 01 to B, 10 to C, and 11 to D. Since each of the BSEL[1:0] combinations is valid, the skip bit is set to a logic zero for all four entries in header table 276, and the start block and end block entries are the appropriate values for the four data streams.

Figure 3:
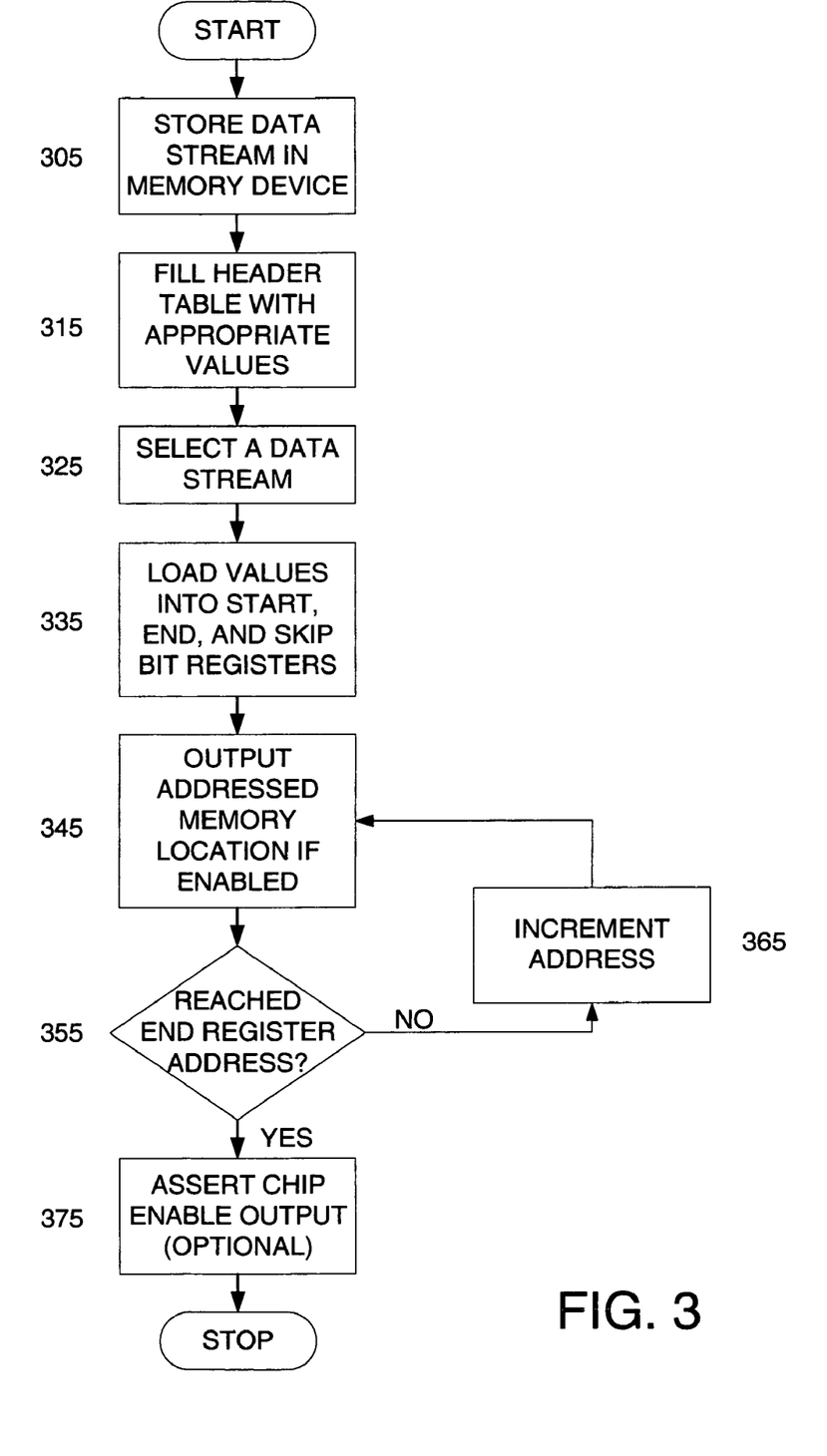
FIG. 3 is a flow diagram illustrating a method in accordance with the present invention for storing multiple data streams in a memory device.

FIG. 3 shows a flow diagram for how the memory device can be used to store and retrieve data streams. First, (step 305) one or more data streams are stored in the memory device. Each data stream can occupy one or more logical blocks, up to the maximum capacity of the memory device. Then, (step 315) appropriate values are entered into the header table of the memory device. Each data stream that is to be selectable by a bank select combination will have a row in the table that contains a logical zero for the skip bit, and the appropriate high order start and end address bits for that data stream. Any bank select combinations that are unused will have a skip bit equal to a logic one, and don't care values for the start and end addresses.

Figure 4:
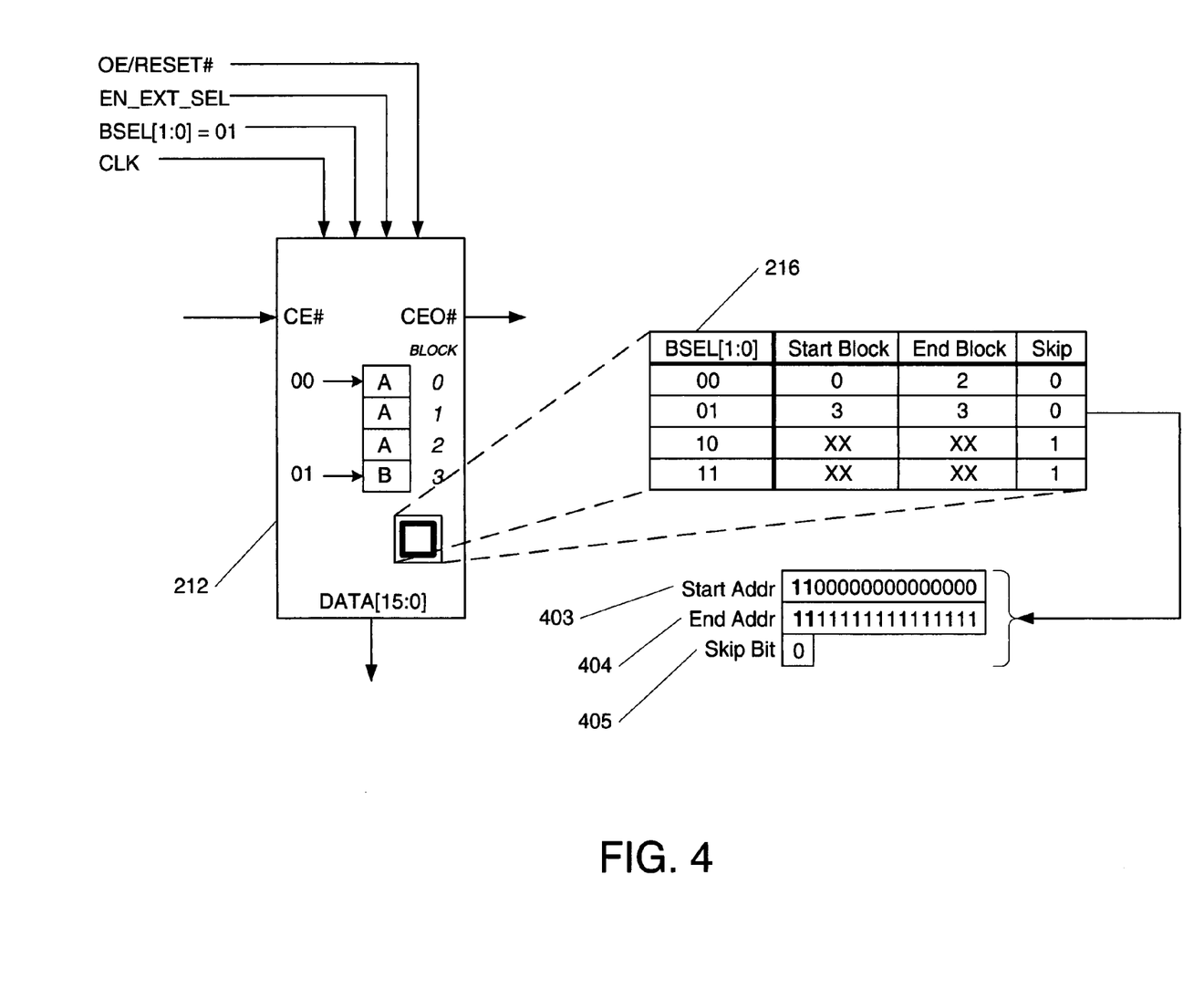
FIG. 4 shows an example memory device in accordance with the present invention, including representations of header table and internal registers.

Next, (step 325) a desired data stream can then be selected for output. In one embodiment, asserting a particular bank select combination on the bank select lines selects the desired data stream. At step 335, the memory device finds the corresponding entry in its header table and loads its internal registers with appropriate values based on the values from that header table entry. The memory device has an internal register for the skip bit, and has internal registers for each of the start and end addresses. In the example of FIG. 4, the bank select combination 01 is asserted on the bank select lines, selecting data stream B in memory device 212. The second row of header table 216, corresponding to bank select combination 01, is loaded into the three registers 403, 404, and 405. Since the header table stores the high order bits (shown in bold in registers 403 and 404) of the start and end block addresses, appropriate low order bits are appended in the registers to make up a valid address. In the example shown in FIG. 4, each complete memory address of the memory device is 16 bits long. In general, memory addresses can be of arbitrary length, depending on the addressing scheme being used. The two high order bits of the address (shown in bold) are taken from the start and end block values in the table. Zeros are appended in start address register 403 and ones are appended in end address register 404 to make up the full 16-bit addresses of this example. Various other memory addressing schemes with possible different appended values will be known to one of ordinary skill in the art.

After registers 403, 404, and 405 have been loaded with appropriate values, the output of the memory device can be enabled (for example, by asserting the OE/RESET# input signal in the figures). Once the output enable of the memory device is asserted, the memory device can begin to output the data stream (FIG. 3, step 345). Output begins at the address in start address register 403. The memory device then checks to see if it has reached the address in end address register 404 (step 355). If not, the address pointer is incremented (step 365) and the next portion of the data stream is output (step 345). After all of the data in the data stream has been output, and the end address has been reached, the memory device can optionally assert a chip enable output signal (step 375), which is shown as the CEO# output pin in the figures. This optional step will be discussed in greater detail below.

In one embodiment, the skip bit (405), start address (403), and end address (404) registers are not loaded by the bank select lines and can be loaded with values from an alternate source, without having to refer to the values stored in the header table. For example, a JTAG (Joint Test Action Group standard, also known as IEEE 1149.1) interface can be used to load values into the registers. A JTAG interface, being a serial data interface, requires only four pins to implement. Other alternative techniques can also be used to load values into the registers of the memory device. At least two advantages can be gained by providing such a secondary interface for loading the registers. First, more than $2^N$ (where N equals the number of bank select lines) data streams can be stored and later retrieved in the memory device. This can be important in more fully utilizing all of the space in the memory device in a case where the number of data streams exceeds the maximum number of data streams selectable by the bank select lines. Second, a secondary interface can be provided that allows certain data streams to be "hidden" in the memory device. That is, data streams that are not accessible through the bank select lines (and that therefore have no entry in the header table) and are only accessible through an alternative interface can be stored in the memory device. This can be useful for restricting access to the hidden data streams. Without knowledge of both the specifics of the alternative interface, and the memory addresses of the hidden data stream, it would be impossible to retrieve the hidden data stream.

Figure 5:
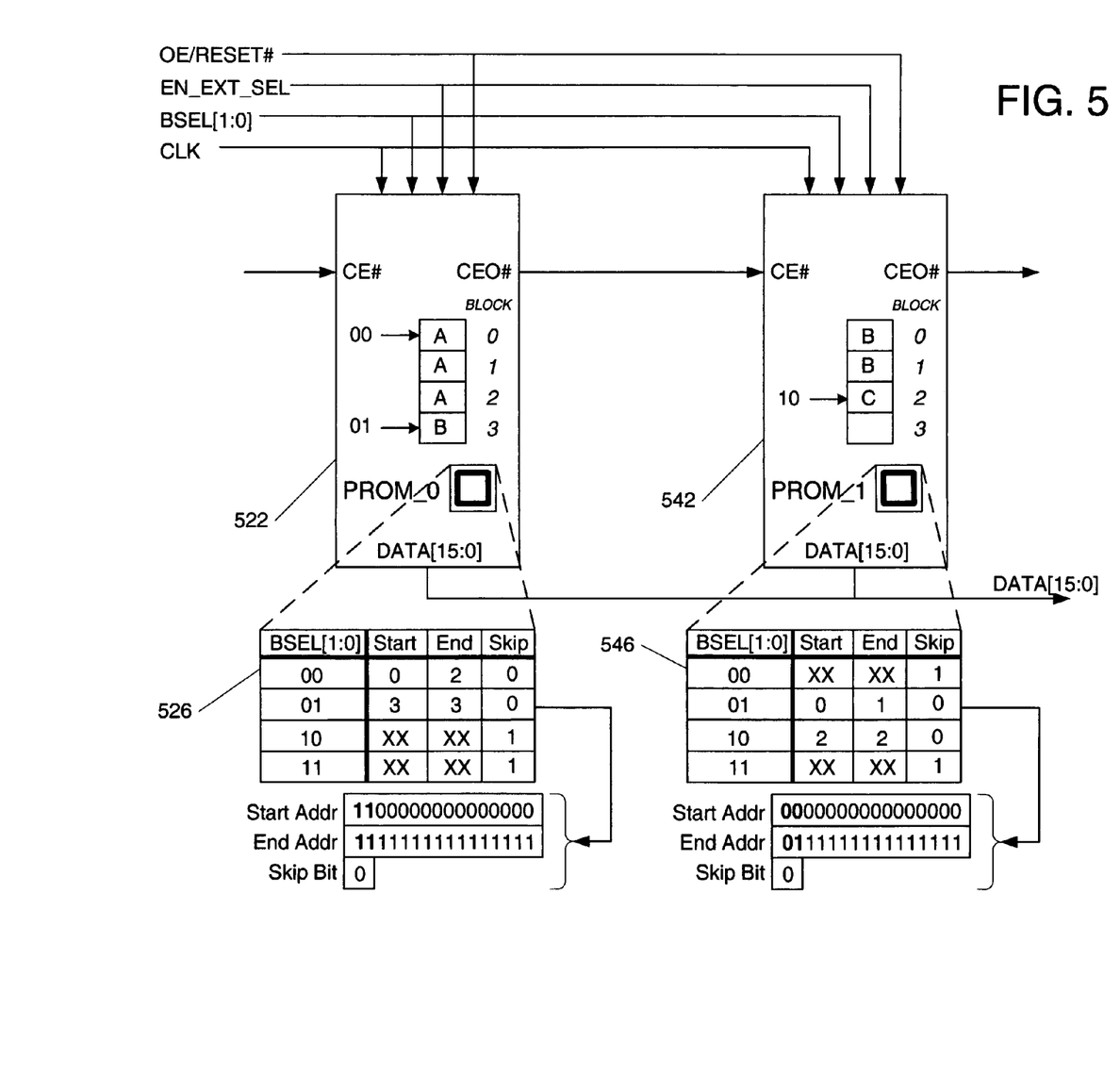
FIG. 5 shows an example with two memory devices connected together in accordance with the present invention.

In accordance with one embodiment of the present invention, several memory devices can be chained together serially for greater storage options. FIG. 5 shows memory devices 522 and 542 connected together and storing data streams A, B, and C. Data stream A occupies the first three blocks of memory device 522, and data stream C occupies one block in memory device 542. Data stream B occupies a total of three blocks split between memory devices 522 and 542. Data stream B occupies one block in memory device 522 and two blocks of memory device 542. The two memory devices share bank select lines, and data stream A is assigned to bank select combination 00, B to 01, and C to 10. The CEO# output from memory device 522 is chained serially to the CE# input of memory device 542. This serial chain of chip enable signals can be extended for chains with more than two memory devices.

To retrieve data stream B, bank select combination 01 is asserted on BSEL[1:0]. Each memory device loads the values corresponding to BSEL[1:0]=01 from its header table into its internal registers, as shown in FIG. 5. Asserting both the chip enable (CE#) signal input to first memory device 522 and the common output enable signal (OE/RESET#) starts the retrieval process, and memory device 522 begins to output data stream B, starting from block 3. In one embodiment, a memory device asserts its CEO# output when it reaches the end of its address range. Thus, once memory device 522 reaches the end of its address range (at the end of block 3), it disables its DATA[15:0] output and asserts its CEO# output. This output is connected to the CE# input of the next memory device, memory device 542, which then outputs the remaining two blocks of data stream B. In another embodiment, a memory device asserts its CEO# output when the end address for a particular data stream is reached.

When a data stream spans more than one memory device, the serial chain of chip enable signals (linking the CEO# output of one device to the CE# input of the next device) allows each memory device to be enabled in succession. In order to retrieve a particular data stream stored in a chain of memory devices, first the internal registers (skip bit, start block, and end block) of each device are loaded with appropriate values for the particular selected data stream (either through bank select lines or through an alternative interface). The chip enable input of the first memory device in the chain and a common output enable signal are then asserted to start the process of outputting the selected data stream. The CEO# output for each memory device will initially be unasserted. Each memory device in the chain waits for its CE# input to be asserted. When CE# is asserted, the memory device will check the value in its skip bit register. If the skip bit register is equal to a logic one, that memory device will not output any data and will assert its CEO# output so that the next memory device in the chain can be activated. If, however, the skip bit register is equal to a logic zero, then the memory device will start outputting data, beginning at the memory location specified by the value in its start address register. After the end address is reached, the memory device will disable its data output and assert its CEO# output to activate the next memory device in the chain. This process continues down the serial chain of memory devices until the entire selected data stream has been retrieved.

In one embodiment, the skip bit register can be checked in each memory device immediately after the output enable signal is asserted (and before the CE# input signal to each memory device has been asserted). If the skip bit is equal to a logic one, the CEO# output can be asserted immediately (without waiting for the CE# input to be asserted). This embodiment allows the first memory device in the chain containing the selected data stream to be enabled immediately, regardless of the length of the chain of memory devices (i.e., without waiting for the CE#/CEO# signals to propagate down the chain). In addition, the CEO# output circuit can include logic to make CEO# dependent on the CE# input signal (rather than on the skip bit) once the skip bit has been recognized as a logic one for a number of clock cycles. This provides a mechanism to set all of the CEO# outputs in the serial chain of memory devices to the inactive state. Thus (after the predetermined number of clock cycles has elapsed) when the CE# input to the first device in the serial chain is set to the inactive state, its CEO# will now be made inactive (regardless of the state of its skip bit). This inactive CEO# value propagates through the serial chain disabling each downstream device in turn (again, independent of the skip bit value in each device).

Figure 6:
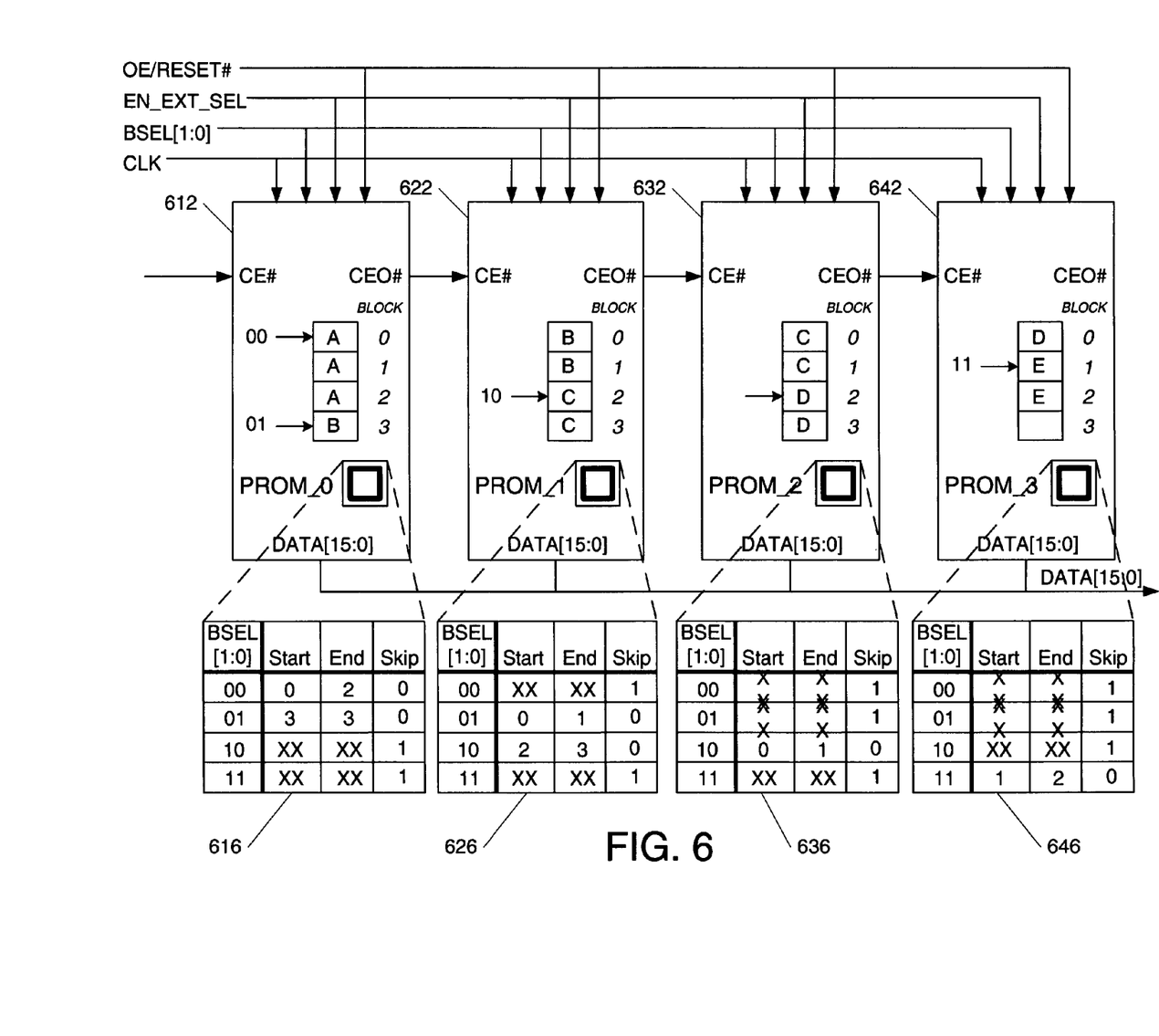
FIG. 6 shows an example with four memory devices connected together in accordance with the present invention.

FIG. 6 shows four memory devices chained together serially and their corresponding header table values. The four memory devices contain 5 data streams (A–E). In this example, bank select combination 00 corresponds to data stream A, 01 to B, 10 to C, and 11 to E. Note that data stream D does not have a corresponding bank select line combination. This means that it is impossible to select data stream D using the BSEL[1:0] bank select lines. Data stream D is therefore hidden, and can only be accessed by loading the internal start, end, and skip registers of each memory device in the chain through an alternative interface, such as JTAG.

Those having skill in the relevant arts of the invention will now perceive various modifications and additions that can be made as a result of the disclosure herein. For example, active-high signals can be replaced with active-low signals, as is known to those of ordinary skill in the art. More than one alternative interface can be provided and used to hide information from different groups of users. While the above description uses both start and end addresses, another embodiment can omit the end address and rely on another mechanism to indicate that all data has been received. For example, an embodiment can be developed that uses a start address for each frame to be reconfigured and does not use end addresses. Another embodiment can use the length of the data stream rather than an end address to determine the end of the data stream has been reached. Yet another embodiment can use a special end-of-data bit sequence.

Accordingly, all such modifications and additions are deemed to be within the scope of the invention, which is to be limited only by the appended claims and their equivalents.

What is claimed is:

1. A method for loading a data stream comprising:
   supplying an identifier of the data stream to a header table; and
   based on the identifier of the data stream, supplying a skip bit and a start address of the data stream to a memory device;
   wherein the skip bit is a single bit indicating whether the supplied start address is a valid or a don't care value.

2. The method of claim 1 wherein the step of supplying a skip bit and a start address of the data stream further comprises supplying an end address of the data stream.

3. A memory device comprising:
   a memory addressing structure wherein the memory addressing structure can provide a start block and a skip bit for at least one data stream;
   a skip bit register for holding the skip bit; and
   a start address register for holding an address corresponding to the start block;
   wherein the skip bit register is a one-bit register, and
   wherein the skip bit indicates whether the address corresponding to the start block is a valid or a don't care value.

4. The memory device of claim 3 wherein the memory addressing structure is a header table.

5. The memory device of claim 3 further comprising at least one bank select line for selecting one of the at least one data stream.

6. The memory device of claim 3 further comprising a JTAG interface for loading values into the skip bit register and the start address register.

7. The memory device of claim 3 further comprising a plurality of interfaces for loading values into the skip bit register and the start address register.

8. The memory device of claim 3 further comprising an end address register for holding an address corresponding to an end block of the at least one data stream.

9. The memory device of claim 3 further comprising a means for determining an end of the at least one data stream.

10. The memory device of claim 3 further comprising a chip enable input terminal and a chip enable output terminal.

11. The memory device of claim 10 wherein the chip enable output terminal is asserted if the value in the skip bit register indicates the data stream is to be skipped.

12. The memory device of claim 11 wherein, after the chip enable output terminal has been asserted for a period of time, the chip enable output terminal is not asserted if the chip enable input terminal is inactive.

13. The memory device of claim 3 wherein the memory addressing structure stores at least one bit of the address corresponding to the start block.

14. The memory device of claim 13 wherein the at least one bit is the high order bit.

15. A chain of memory devices comprising:
   a first memory device comprising:
      a first table, wherein the table can store a start block and a skip bit for at least one data stream;
      a first start address register;
      a first skip bit register; and
      a first chip enable output terminal;
   a second memory device comprising:
      a second table, wherein the table can store a start block and a skip bit for at least one data stream;
      a second start address register;
      a second skip bit register; and
      a second chip enable input terminal connected to the first chip enable output terminal.

16. The chain of claim 15 wherein a chip enable bit passed from the first chip enable output terminal to the second chip enable input terminal transfers control from the first memory device to the second memory device.

* * * * *